United States Patent
Alexander et al.

(10) Patent No.: US 8,019,718 B2
(45) Date of Patent: Sep. 13, 2011

(54) METHOD AND SYSTEM FOR COLLABORATIVE LEARNING

(75) Inventors: Jamie Alexander, Toronto (CA); Edward E. Kelley, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 732 days.

(21) Appl. No.: 12/046,865

(22) Filed: Mar. 12, 2008

(65) Prior Publication Data

US 2009/0234894 A1    Sep. 17, 2009

(51) Int. Cl.
*G06F 7/00* (2006.01)
(52) U.S. Cl. .......................................................... 707/608
(58) Field of Classification Search .................... 707/608
See application file for complete search history.

(56) References Cited

U.S. PATENT DOCUMENTS

| | | | |
|---|---|---|---|
| 5,208,748 A * | 5/1993 | Flores et al. ...................... 704/1 |
| 6,061,697 A * | 5/2000 | Nakao ............................ 715/229 |
| 6,610,102 B1 * | 8/2003 | Aldred et al. .................. 715/234 |
| 2002/0065848 A1 * | 5/2002 | Walker et al. .................. 707/511 |
| 2002/0107994 A1 * | 8/2002 | Rickards et al. ............... 709/313 |
| 2002/0188607 A1 | 12/2002 | Kogut-O'Connell et al. |
| 2004/0115596 A1 | 6/2004 | Snyder et al. |
| 2006/0105315 A1 | 5/2006 | Shaver |
| 2007/0009872 A1 | 1/2007 | Sonsteng et al. |

* cited by examiner

*Primary Examiner* — Tim T. Vo
*Assistant Examiner* — Gary Koo
(74) *Attorney, Agent, or Firm* — Cantor Colburn LLP

(57) ABSTRACT

A method for collaborative teaching and learning, while facilitating simultaneous and dynamic changes by multiple users, includes: receiving a command to add or modify an existing topic record in a series of topic records in response to a user request; creating a new record in the event the received command is to add a new topic record; generating a modify token in the event the received command is to modify an existing topic record; deleting the modify token in response to completion of modifying the existing topic record; wherein the modify token prevents additional users from editing the existing topic record, but allows for the existing record to copied and modified while the first user is modifying the existing topic record; and wherein a collaboration engine generates and manages the modify token.

19 Claims, 7 Drawing Sheets

METHOD AND SYSTEM FOR COLLABORATIVE LEARNING

BACKGROUND OF THE INVENTION

1. Field of the Invention

This invention relates generally to computer software, and more particularly to a method, article, and system that provides for collaborative teaching and learning, while facilitating simultaneous and dynamic changes by multiple users.

2. Description of the Related Art

A growing trend in education today is the use of the Internet to provide online educational coursework through electronic forums. Online courses offer exceptional accessibility, and are a flexible resource for gaining new skills, meeting professional development requirements, or advancing to a career with a program certificate. Online training allows for the convenience of "coming to class" whenever it's convenient, by choosing when and where to participate in class. Online courses are conducted according to a schedule, but there are no "live" classes to attend. Instead, lectures, coursework, and discussions all take place at one's convenience. Online students choose the place—at home, at school, at work—wherever they have access to a computer, modem, and an Internet Service Provider (ISP). Online students obtain the same high-quality instruction and course content that they demand, but without the day-to-day obstacles that prevent so many of them from pursuing their goals. With online learning, commuting to a campus is a thing of the past.

SUMMARY OF THE INVENTION

Embodiments of the present invention include a method, article, and system for collaborative teaching and learning, while facilitating simultaneous and dynamic changes by multiple users, the method includes: receiving a command to add or modify a topic record in a series of topic records in response to a user request; creating a new record in the event the received command is to add a new topic record; generating a modify token in the event the received command is to modify an existing topic record; deleting the modify token in response to completion of modifying the existing topic record; wherein the modify token prevents additional users from editing the existing topic record while the user is modifying the existing topic record; wherein in the event the modify token has been issued, the additional users can copy an existing record, modify the copy of the existing record, and assign a new name to the modified copy of the existing record while the existing record is being modified by the user; and wherein a collaboration engine generates and manages the modify token.

An article comprising one or more computer-readable storage media containing instructions that when executed by a computer enables collaborative teaching and learning, while facilitating simultaneous and dynamic changes by multiple users, wherein the method further includes: receiving a command to add or modify a topic record in a series of topic records in response to a user request; creating a new record in the event the received command is to add a new topic record; generating a modify token in the event the received command is to modify an existing topic record; deleting the modify token in response to completion of modifying the existing topic record; wherein the modify token prevents additional users from editing the existing topic record while the user is modifying the existing topic record; wherein in the event the modify token has been issued, the additional users can copy an existing record, modify the copy of the existing record, and assign a new name to the modified copy of the existing record while the existing record is being modified by the user; wherein a collaboration engine generates and manages the modify token; wherein in the event the user requests the subdivision of a topic record from the series of topic records the method further comprises: generating a subdivide token; releasing the subdivide token in response to the completion of the subdivision of the topic record; wherein in the event an additional user requests to edit the existing record while the subdivision token is in use by the user, a copy of the original record is generated to create a new record that is a subset of the original record; wherein in the event the modify token has been issued, the additional users can copy an existing record, modify the copy of the existing record, and assign a new name to the modified copy of the existing record while the existing record is being subdivided by the user; and wherein a collaboration engine generates and manages the subdivide token.

A system for collaborative teaching and learning, while facilitating simultaneous and dynamic changes by multiple users, the system includes: one or more server devices configured with a collaboration engine, a reconciliation engine, and a scheduling engine; the one or more server devices in communication with one or more client devices through a network; the server devices and the client devices configured to execute electronic software; wherein the electronic software is resident on storage mediums in signal communication with the client and server devices; wherein the electronic software comprises a series of instructions configured for: receiving a command to add or modify a topic record in a series of topic records in response to a user request; creating a new record in the event the received command is to add a new topic record; generating a modify token in the event the received command is to modify an existing topic record; deleting the modify token in response to completion of modifying the existing topic record; wherein the modify token prevents additional users from editing the existing topic record while the user is modifying the existing topic record; wherein in the event the modify token has been issued, the additional users can copy an existing record, modify the copy of the existing record, and assign a new name to the modified copy of the existing record while the existing record is being modified by the user; wherein the collaboration engine generates and manages the modify token; wherein in the event the user requests the subdivision of a topic record from the series of topic records the method further comprises: generating a subdivide token; releasing the subdivide token in response to the completion of the subdivision of the topic record; wherein in the event an additional user requests to edit the existing record while the subdivision token is in use by the user, a copy of the original record is generated to create a new record that is a subset of the original record; wherein in the event the modify token has been issued, the additional users can copy an existing record, modify the copy of the existing record, and assign a new name to the modified copy of the existing record while the existing record is being subdivided by the user; and wherein the collaboration engine generates and manages the subdivide token.

TECHNICAL EFFECTS

As a result of the summarized invention, a solution is technically achieved for a method, article, and system for providing collaborative teaching and learning, while facilitating simultaneous and dynamic changes by multiple users.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
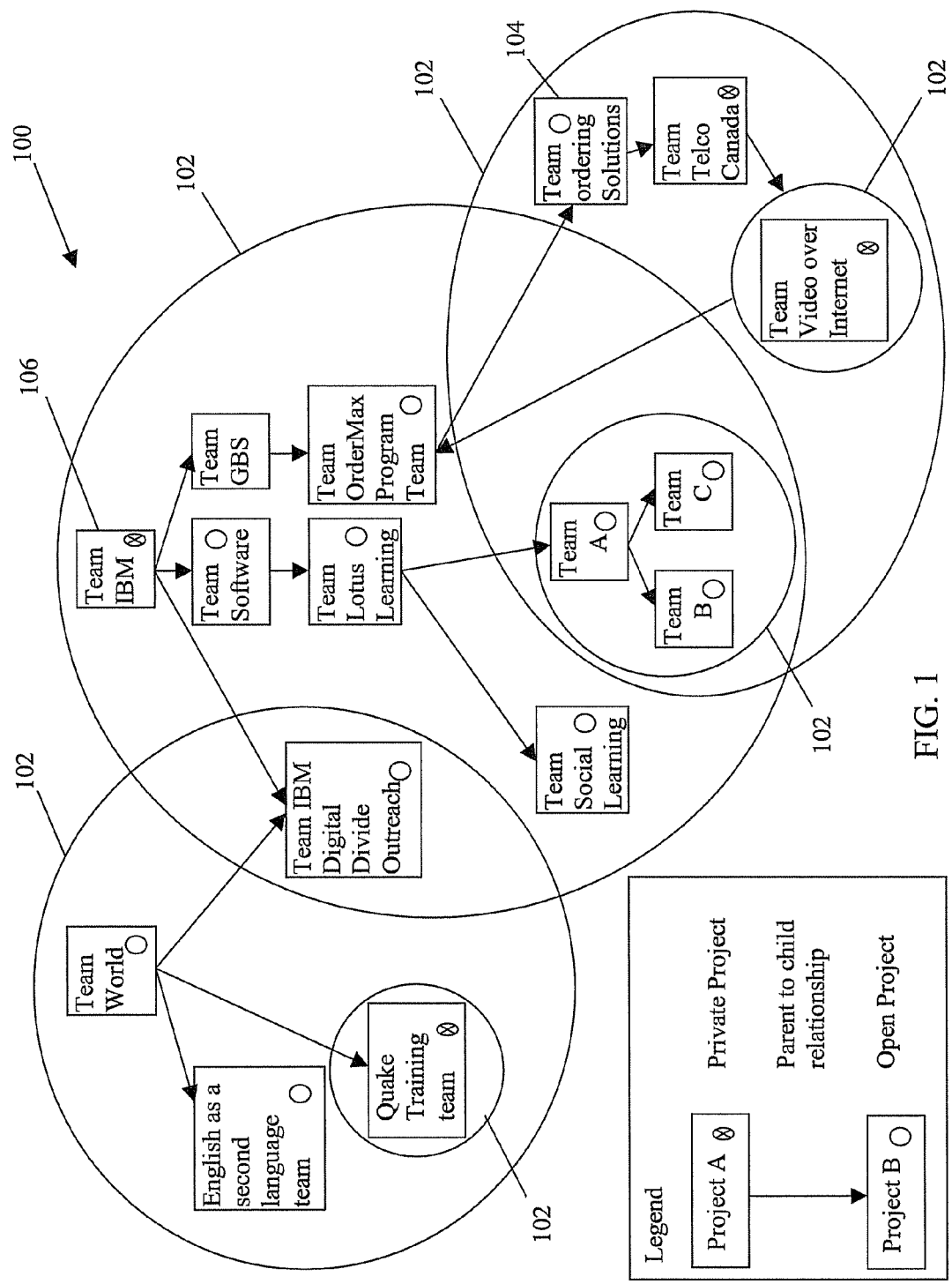
FIG. 1 illustrates a Venn diagram showing the relationships between organizations, mentors and students in an educational system with private and open teams according to embodiments of the invention.

The detailed description explains the preferred embodiments of the invention, together with advantages and features, by way of example with reference to the drawings.

DETAILED DESCRIPTION

Even with the advent of online education, many problems arise due to the coarse grained nature of traditional courses that offer training on particular subjects. Students encounter a significant overlap in content delivered through training they have already received, thereby diminishing the effectiveness of the course. In addition, there are a limited number of instructors available who have the expertise in all of the subjects within a course. Finally, collaboration programs presently do not allow simultaneous updates of records by different users, because a second record update will overwrite changes made by the first record update.

Embodiments of the invention provide a system and method that addresses the aforementioned problems that are associated with traditional educational approaches. Embodiments of the invention breakdown courses into fine-grained topics, where experts in particular subjects may define their own topics to share. In embodiments of the invention, individuals may sign up to be instructors to teach particular topics, while students may build their own courses by selecting topics. Students may also request topics that are not yet available. Individuals or mentors may build courses for their proteges by selecting topics. Embodiments of the invention, determine if topics are similar in order to increase the pool of instructors in a given subject area, while also matching up students and instructors in classes based on a certain threshold of requests for a topic or similar topic. In addition, embodiments of the invention maintain calendars for instructors and automatically schedule classes. Finally, in embodiments of the invention a collaboration engine manages tokens by modifying and subdividing the tokens to permit multiple access and simultaneous modification to records, under a set of system modification rules, while a reconciliation engine eliminates duplicate courses and topics.

Embodiments of the invention utilize software that capture topics, and present the topics for students to select. Participants who wish to teach a topic, or group of topics, may indicate their preferences via the software. The software will allow the students to construct their own classes from the list of topics. The software will match the topics and groups of topics with instructors. The software will determine if there is a need to increase the pool of instructors in a given topic. The software will match the topics with instructors with students and automatically schedule classes on the students and instructors calendars. A graphical user interface (GUI) may be implemented with the software to carryout embodiments of the learning system.

Embodiments of the invention may be offered as a software service on the Web, and may be managed from a central area. In an enterprise environment, organizations may have a directory with permissions for users. Each enterprise may have their own virtual service, where each enterprise may protect their content, and may also share their content if they choose to, as illustrated by the Venn diagram of FIG. 1.

FIG. 1 illustrates a Venn diagram 100 showing the relationships between organizations, mentors and students in an educational system with private and open teams according to embodiments of the invention. The circles 102 represent separate organizations that are made up of one or more teams (104, 106). The teams may be open 104 or private 106. In embodiments of the invention, a pool of mentors, a variety of topics, and an audience of students may cross-organizational boundaries. The extent to which mentors and topics are made available across organizational boundaries is in the control of the originating organization through the use of private 106 or open teams 104. Individuals belonging to teams (104, 106) contained within the organizational circles 102 define access to topics and mentors. Overlapping organizational circles 102 show areas where topics and mentors are available across organizations.

Figure 2:
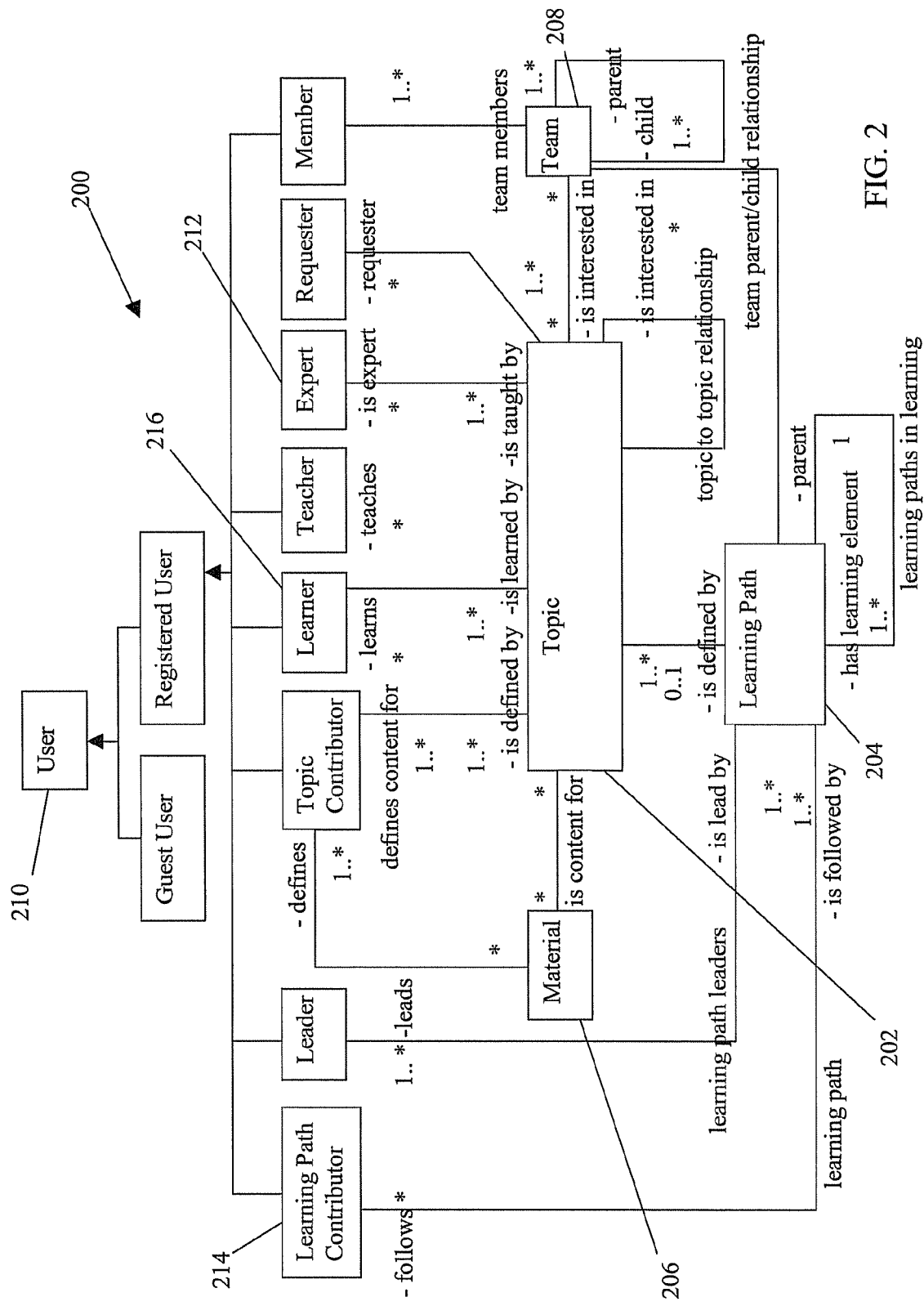
FIG. 2 is a domain model illustrating the relationships between entities required for a learning system according to embodiments of the invention.

FIG. 2 is a domain model 200 illustrating the relationships between entities required for a learning system according to embodiments of the invention. The domain model 100 is a model of the structure and relationships of real world entities required to support embodiments of the invention. The notation for the domain model 100 is defined using the Unified Modeling Language (UML). UML is a standardized specification language for object modeling. UML is a general-purpose modeling language that includes a graphical notation used to create an abstract model of a system, referred to as a UML model. Key elements within the domain model 200 of embodiments of the invention include topics 202, learning paths 204, material 206, teams 208, users 210, experts 212, contributors 214, and learners 216.

Continuing with FIG. 2, a topic 202 is a nugget of learning, which is fine grained enough that it might be learned in a relatively short amount of time. The fine-grained nature of topics 202, allows for topics 202 to be organized and re-organized into groups or learning paths 204 that provide broader learning objectives. The fine-grained nature of topics 202 also increases the likelihood of learners 216 to eventually become experts 212 that may train other learners 216 on the topic 202. A learning path 204 defines a collection of topics 202 that when learned together result in a completion of a learning objective. Material 206 is all the content that makes up a topic 202. Material 206 may be captured in a file that is uploaded, may be a uniform resource locator (URL) link to external content, or may be a Wiki. Material 206 may be shared by more than one topic 202. A team 208 is formed with members with common concerns that band together to facilitate team specific learning. A team 208 may express interest in relevant topics 208 and learning paths 204. A user 210 is any individual that performs a role within this invention. A user 210 may simultaneously be acting in many different roles (e.g., contributors 214 and experts 212) depending on their involvement in individual topics 202. An expert 212 is someone one who may be consulted on a topic 202 on demand, and who may be willing to teach topics 202 in live or virtual interactive classes. An expert 212 may also accept requests to teach topics 202. Any user 210 may sign up to become an expert 212. A contributor 214 helps to define the content for a topic 202, or learning path 204. A user 210 automatically becomes a contributor 214 when adding, editing or removing topic 202 materials 206. Finally, a learner 216 is someone who has learned a topic. A user 210 automatically becomes a learner 216, if they view materials 206 for a topic 202, and are not already identified as a contributor 214 or expert 212 for the topic 202.

Figure 3:
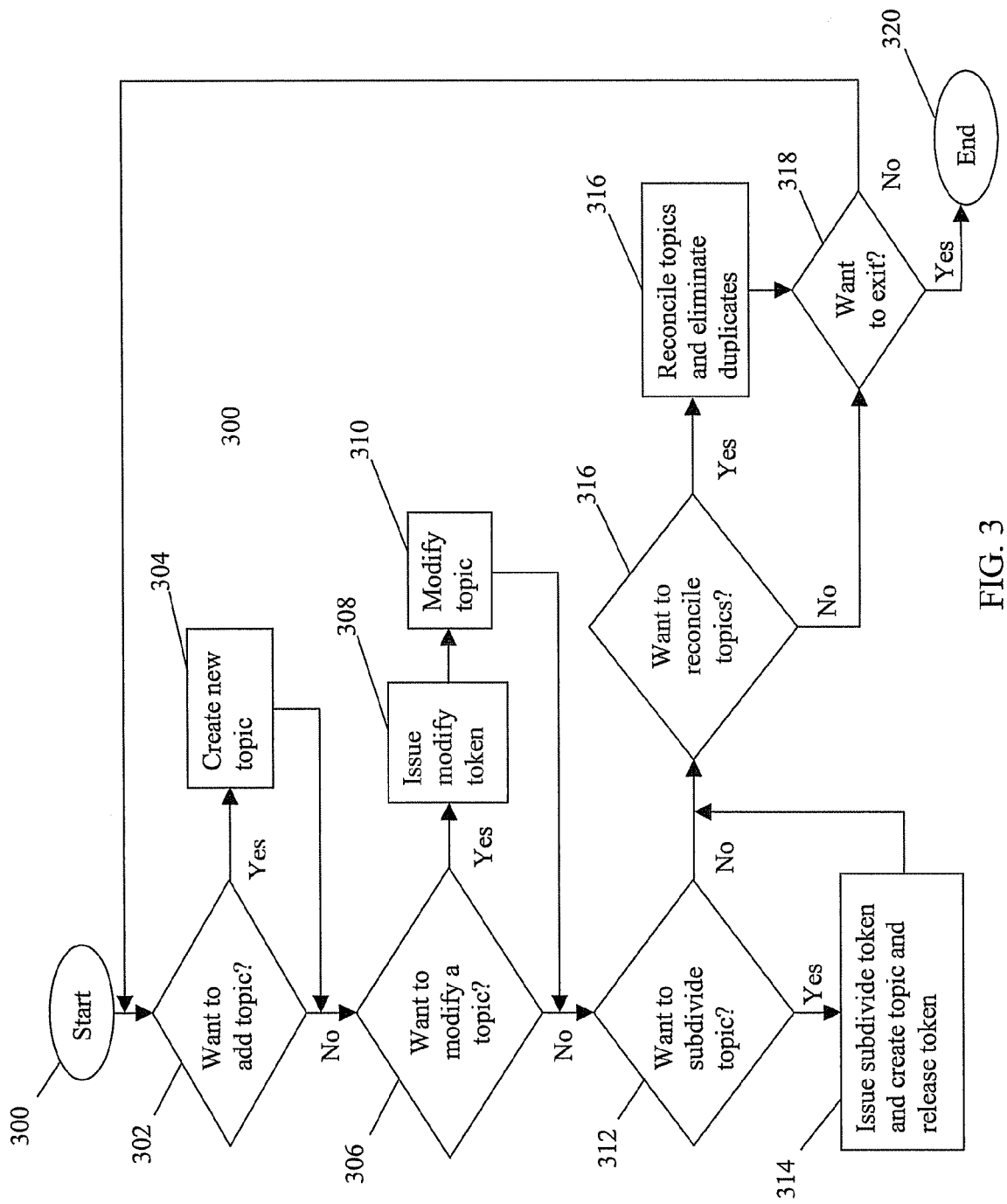
FIG. 3 shows a flowchart for a method for adding and modifying topics in a learning system that matches topics, teachers, and students according to embodiments of the invention.

FIG. 3 shows a flowchart for a method for adding and modifying topics in a learning system that matches topics, teachers, and students according to embodiments of the invention. The process starts (block 300) with a user either adding (decision block 302) or modifying a topic (decision block 306). If the user wants to add a new topic (decision block 302 is Yes), a new topic is created (block 304). If the user wants to modify an existing topic (decision block 306 is Yes), the collaboration engine (see FIG. 7) will issue a modify token (block 308) that allows the to modify the topic (block 310). The modify token prevents other users from editing the record while the user is modifying the record. The issued modify token, however, does not prevent others from copying the record, and modifying it with a different assigned name, to create a new subset of the record that the other users in a learning system may modify. The copying of the record is used for subdividing a topic record. The modify token is deleted following the users completion of modification.

Continuing with FIG. 3, if the user wants to subdivide the topic record (decision block 312 is Yes), a sub divide token is issued (block 314). The subdivide token does not prevent others from editing the record at the same time, by allowing a copy of the original record in order to create a new record that is a subset of the original record. Copying of the original record will occur even if there is someone editing the original record. The subdivide token is released following completion of the subdivision. A new subdivide record is created only if changes have occurred to the original record, otherwise the copy of the record is deleted. If the user wants to reconcile topics (decision block 316), a reconciliation of topics occurs (block 316), and duplicate topic records are eliminated. If the user wants to exit the learning system (decision block 318 is Yes), the process ends (block 320), or else the process repeats.

Figure 4:
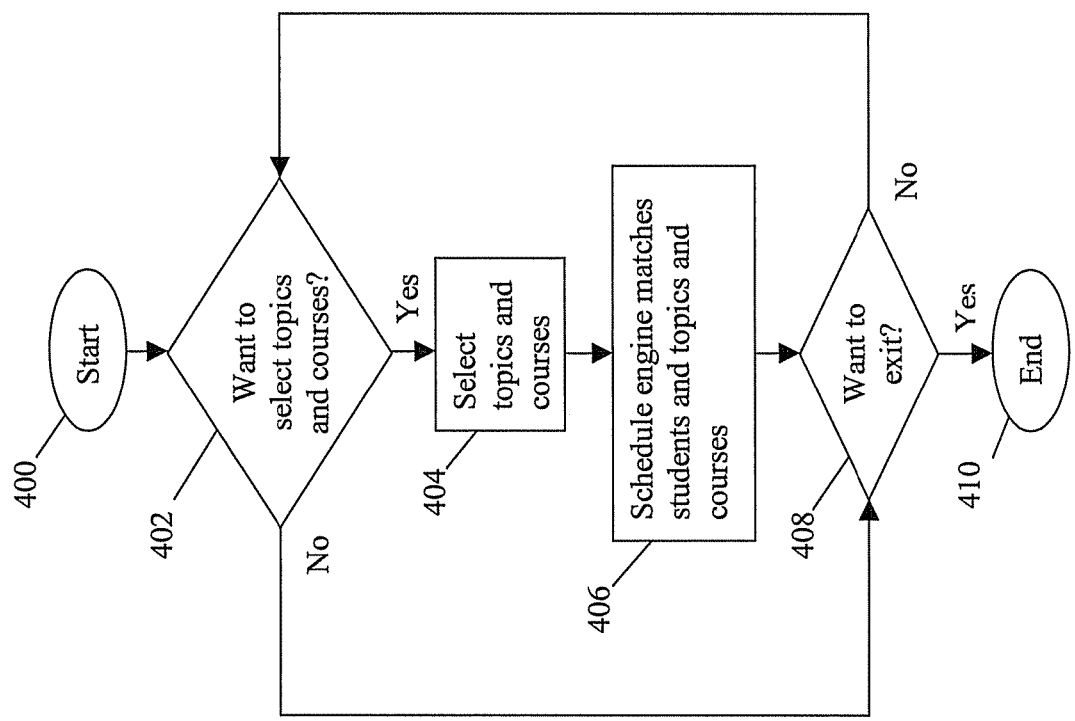
FIG. 4 shows a flowchart for a method for scheduling topics and courses in a learning system that matches topics, teachers, and students according to embodiments of the invention.

FIG. 4 shows a flowchart for a method for scheduling topics and courses in a learning system that matches topics, teachers, and students according to embodiments of the invention. The process starts (block 400) when the user wants to select topics and courses (decision block 402 is Yes), and the user selects the topics and courses (block 404), and a schedule engine (see FIG. 7) matches students with topics and courses. If the user wants to exit the learning system (decision block 408 is Yes), the process ends (block 410), or else the process repeats.

Figure 5:
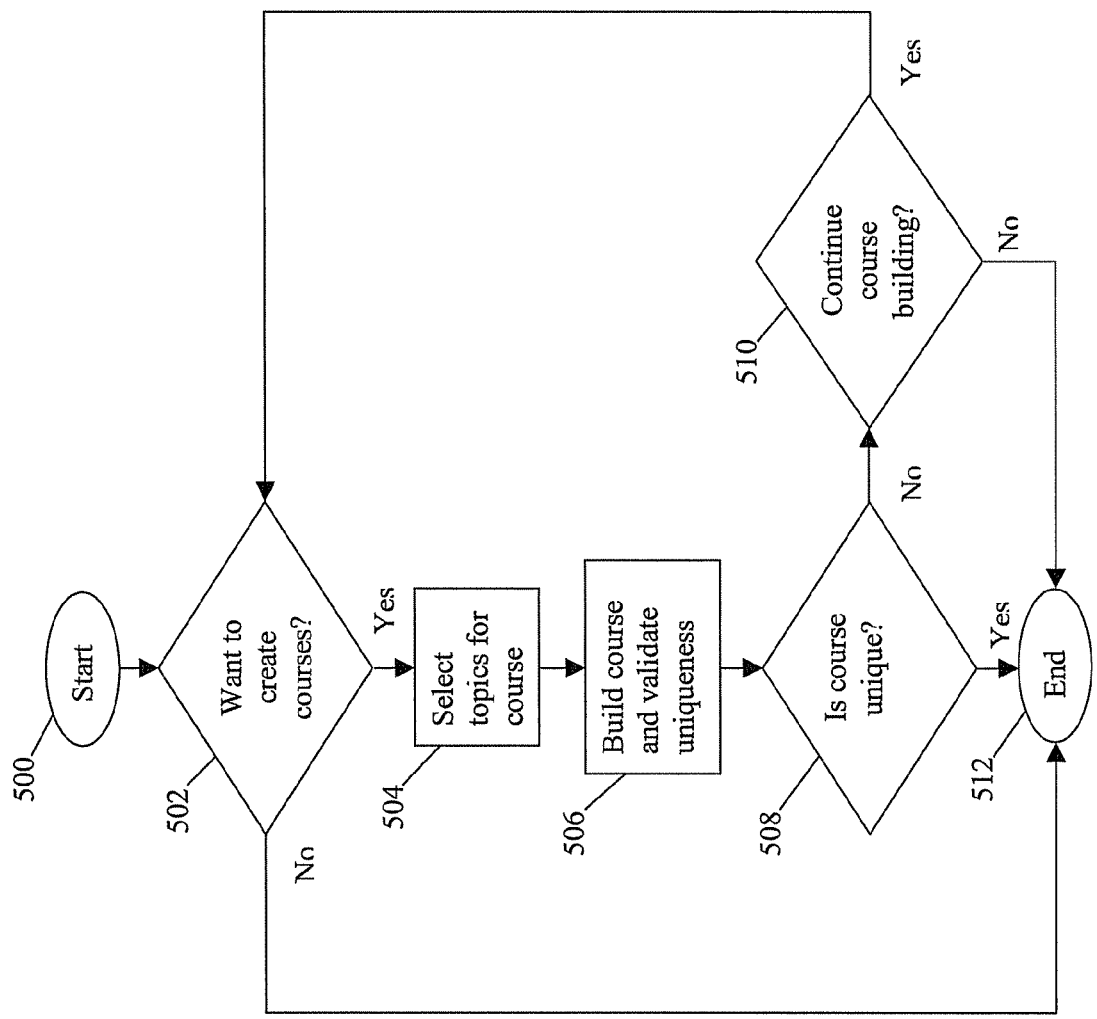
FIG. 5 shows a flowchart for a method for building a course in a learning system that matches topics, teachers, and students according to embodiments of the invention.

FIG. 5 shows a flowchart for a method for building a course in a learning system that matches topics, teachers, and students according to embodiments of the invention. The process starts (block 500) when a user wants to build or create a course (decision block 502 is Yes), and the user selects the topics for the courses (block 504). The course is built and validated for uniqueness (block 506). If the course is unique (decision block 508 is Yes) the process ends (block 512), otherwise the user is prompted as to whether they want to continue to build the course (decision block 510) and the process repeats or ends (block 512).

Figure 6:
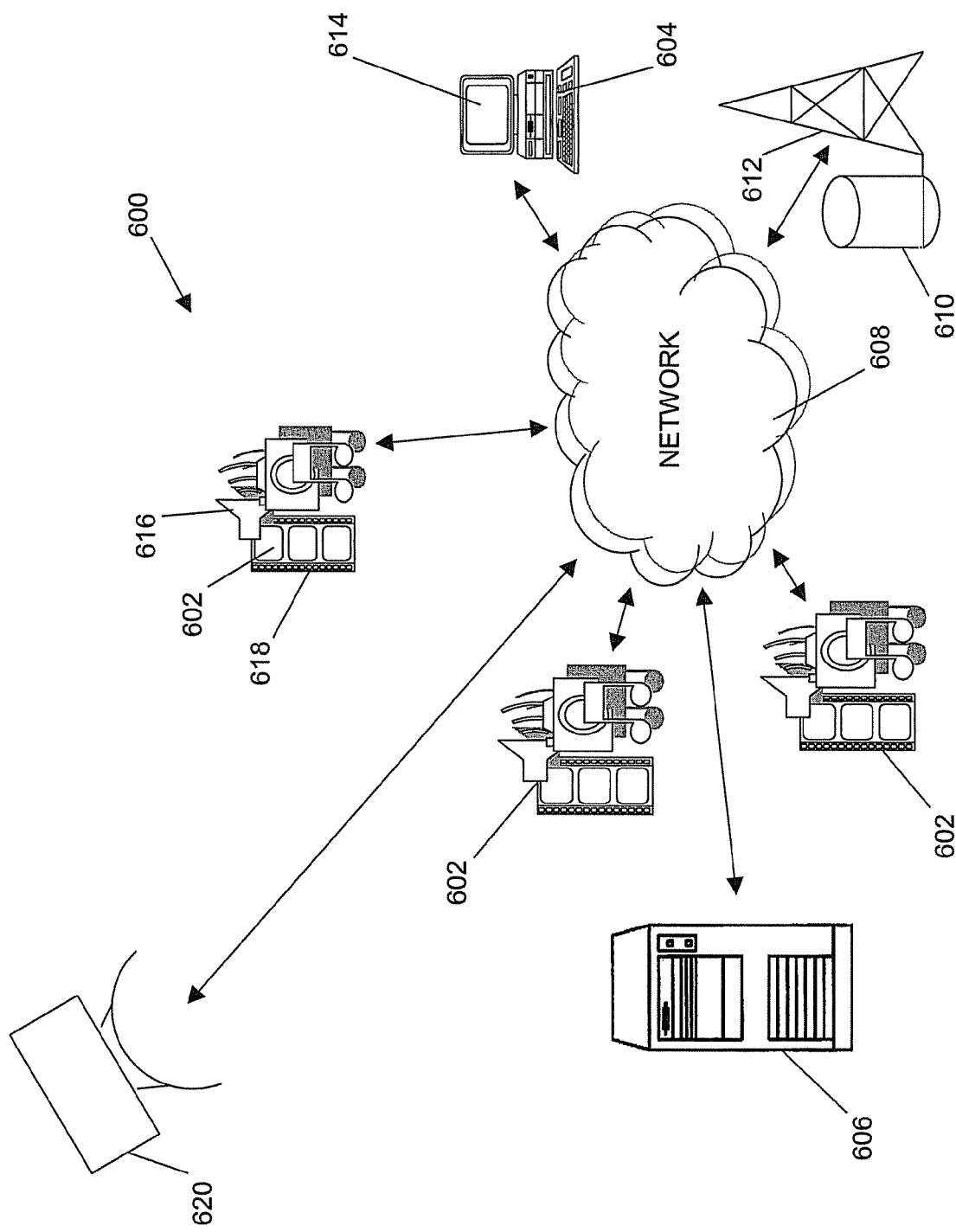
FIG. 6 is a block diagram illustrating an exemplary system that may be utilized to implement exemplary embodiments of the invention.

FIG. 6 is a block diagram illustrating an exemplary system 600 that may be utilized to implement a learning system according to embodiments of the invention. The system 600 includes remote devices in the form of multimedia devices 602, and desktop computer devices 604 configured with display capabilities 614 for implementing graphical user interface (GUI) aspects of the invention described herein. The multimedia devices 602 may be mobile communication and entertainment devices, such as cellular phones and mobile computing devices that are wirelessly connected to a network 608. The multimedia devices 602 have video displays 618 and audio outputs 616 for implanting the GUI described herein. The network 608 may be any type of known network including a fixed wire line network, cable and fiber optics, over the air broadcasts, satellite 620, local area network (LAN), wide area network (WAN), global network (e.g., Internet), intranet, etc. with data/Internet capabilities as represented by server 606. Communication aspects of the network are represented by cellular base station 610 and antenna 612.

Software for carrying out features of embodiments of the invention may be resident on the individual multimedia devices 602 and desktop computers 604, or stored within the server 606 or cellular base station 610.

Figure 7:
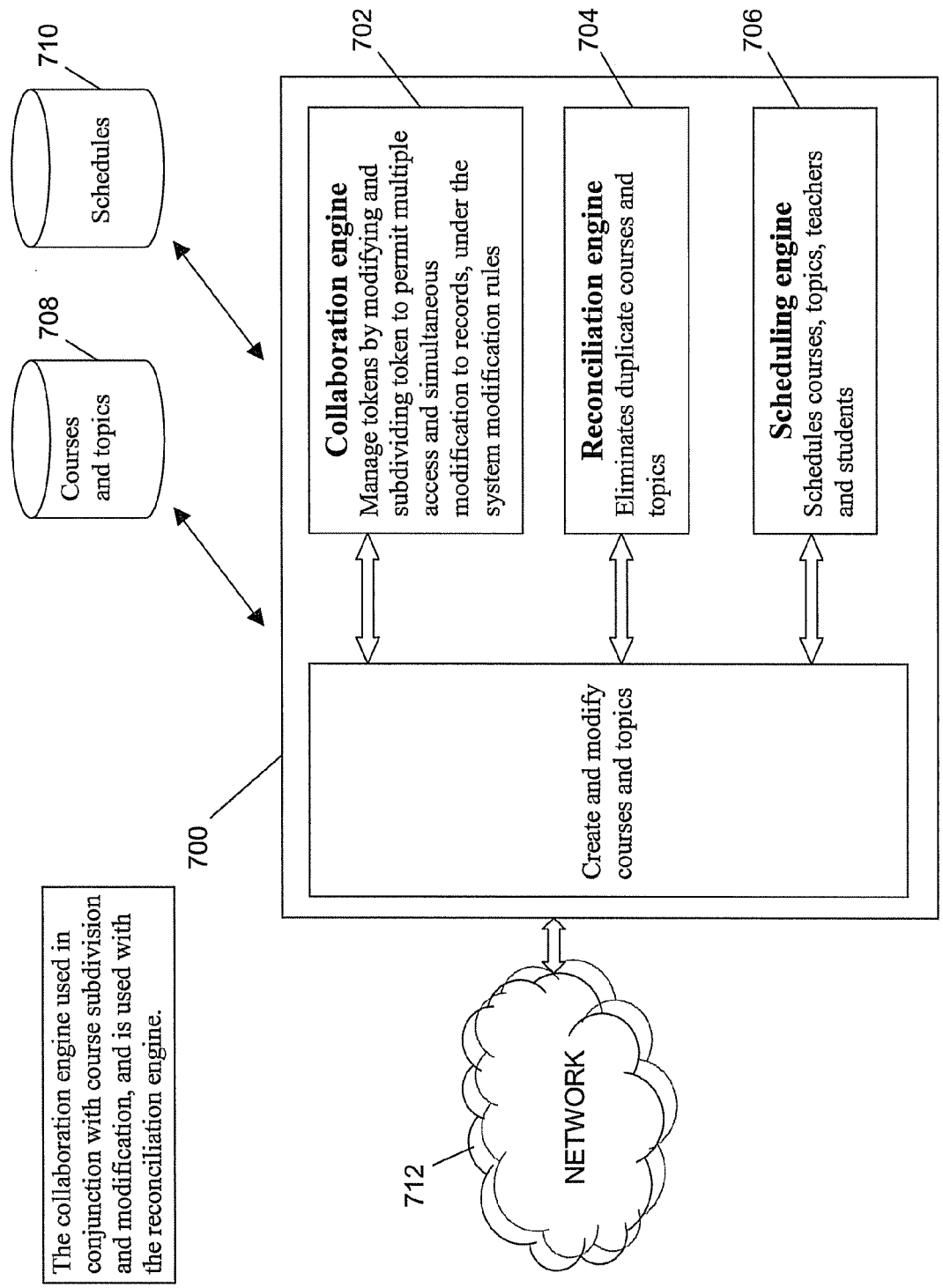
FIG. 7 is a functional block diagram of a learning system according to embodiments of the invention.

FIG. 7 is a functional block diagram of a learning system server 700 (corresponding to the server 606 of FIG. 6) according to embodiments of the invention. The server 700 has a collaboration engine 702, a reconciliation engine 704, and a scheduling engine that are configured to create and modify courses and topics in a learning system. The collaboration engine 702 manages tokens by modifying and subdividing tokens to permit multiple access and simultaneous modification to records, under a set of system modification rules. The reconciliation engine 704 eliminates duplicate courses and topics. The scheduling engine 706 is configured to schedule courses, topics, teachers, and students. Storage units 708 and 710 store information related to courses and topics, and schedules, respectively, and is in electrical communication with the server 700. The server communicates with users via network 712 (corresponding to the network 608 of FIG. 6).

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for collaborative teaching and learning, while facilitating simultaneous and dynamic changes by multiple users, the method comprising:
   receiving a command to add or modify a topic record in a series of topic records in response to a user request;
   creating a new record in the event the received command is to add a new topic record;
   generating a modify token in the event the received command is to modify an existing topic record;
   deleting the modify token in response to completion of modifying the existing topic record;
   wherein the modify token prevents additional users from editing the existing topic record while the user is modifying the existing topic record;
   wherein in the event the modify token has been issued, the additional users can copy an existing record, modify the copy of the existing record, and assign a new name to the modified copy of the existing record while the existing record is being modified by the user; and
   wherein a collaboration engine generates and manages the modify token;
   wherein in the event the user requests a subdivision of a topic record from the series of topic records the method comprises:
   generating a subdivide token;
   releasing the subdivide token in response to the completion of the subdivision of the topic record;
   wherein in the event an additional user requests to edit and subdivide the existing record while the subdivision token is in use by the user, a copy of the original record is generated to create a new record that is a subset of the original record;
   wherein in the event the modify token has been issued, the additional users can copy an existing record, modify the copy of the existing record, and assign a new name to the modified copy of the existing record while the existing record is being subdivided by the user; and
   wherein a collaboration engine generates and manages the subdivide token.

2. The method of claim 1, wherein the series of topic records are reconciled to eliminate duplicate topic records; and
   wherein the series of topic records are reconciled by a reconciliation engine.

3. The method of claim 1, wherein in response to a user selected topic record from the series of topic records, a schedule engine matches the user with one or more courses that cover the selected topic.

4. The method of claim 1, further comprising, in response to a user request to build a course:
   generating a list of topics;
   building a course based on user selections from the list of topics; and
   validating the course as unique.

5. The method of claim 1, wherein a graphical user interface (GUI) is configured for collaborative teaching and learning.

6. The method of claim 1, wherein a domain model is used to define relationships between users.

7. The method of claim 6, wherein the domain model is based on a Unified Modeling Language (UML).

8. The method of claim 1, wherein users are members of private and open teams; and
   wherein topic records in open teams are available to share with one or more other teams or organizations.

9. An article comprising one or more computer-readable storage media containing instructions that when executed by a computer enables a method for collaborative teaching and learning, while facilitating simultaneous and dynamic changes by multiple users, wherein the method further comprises:
   receiving a command to add or modify a topic record in a series of topic records in response to a user request;
   creating a new record in the event the received command is to add a new topic record;
   generating a modify token in the event the received command is to modify an existing topic record;
   deleting the modify token in response to completion of modifying the existing topic record;
   wherein the modify token prevents additional users from editing the existing topic record while the user is modifying the existing topic record;
   wherein in the event the modify token has been issued, the additional users can copy an existing record, modify the copy of the existing record, and assign a new name to the modified copy of the existing record while the existing record is being modified by the user; and
   wherein a collaboration engine generates and manages the modify token;
   wherein in the event the user requests the subdivision of a topic record from the series of topic records the method further comprises:
   generating a subdivide token;
   releasing the subdivide token in response to the completion of the subdivision of the topic record;
   wherein in the event an additional user requests to edit the existing record while the subdivision token is in use by the user, a copy of the original record is generated to create a new record that is a subset of the original record;
   wherein in the event the modify token has been issued, the additional users can copy an existing record, modify the copy of the existing record, and assign a new name to the modified copy of the existing record while the existing record is being subdivided by the user; and
   wherein a collaboration engine generates and manages the subdivide token.

10. The article of claim 9, wherein the series of topic records are reconciled to eliminate duplicate topic records; and
    wherein the series of topic records are reconciled by a reconciliation engine.

11. The article of claim 9, wherein in response to a user selected topic record from the series of topic records, a schedule engine matches the user with one or more courses that cover the selected topic.

12. The article of claim 9, wherein in response to a user request to build a course, the method further comprises:
    generating a list of topics;
    building a course based on user selections from the list of topics; and
    validating the course as unique.

13. The article of claim 9, wherein a graphical user interface (GUI) is configured for collaborative teaching and learning.

14. A system for collaborative teaching and learning, while facilitating simultaneous and dynamic changes by multiple users, the system comprising:

one or more server devices configured with a collaboration engine, a reconciliation engine, and a scheduling engine;

the one or more server devices in communication with one or more client devices through a network;

the server devices and the client devices configured to execute electronic software;

wherein the electronic software is resident on storage mediums in signal communication with the client and server devices;

wherein the electronic software comprises a series of instructions configured for:

receiving a command to add or modify a topic record in a series of topic records in response to a user request;

creating a new record in the event the received command is to add a new topic record;

generating a modify token in the event the received command is to modify an existing topic record;

deleting the modify token in response to completion of modifying the existing topic record;

wherein the modify token prevents additional users from editing the existing topic record while the user is modifying the existing topic record;

wherein in the event the modify token has been issued, the additional users can copy an existing record, modify the copy of the existing record, and assign a new name to the modified copy of the existing record while the existing record is being modified by the user;

wherein the collaboration engine generates and manages the modify token;

wherein in the event the user requests the subdivision of a topic record from the series of topic records the method further comprises:

generating a subdivide token;

releasing the subdivide token in response to the completion of the subdivision of the topic record;

wherein in the event an additional user requests to edit the existing record while the subdivision token is in use by the user, a copy of the original record is generated to create a new record that is a subset of the original record;

wherein in the event the modify token has been issued, the additional users can copy an existing record, modify the copy of the existing record, and assign a new name to the modified copy of the existing record while the existing record is being subdivided by the user; and wherein the collaboration engine generates and manages the subdivide token.

15. The system of claim 14, wherein the series of topic records are reconciled to eliminate duplicate topic records; and wherein the series of topic records are reconciled by the reconciliation engine.

16. The system of claim 14, wherein in response to a user selected topic record from the series of topic records, the schedule engine matches the user with one or more courses that cover the selected topic.

17. The system of claim 14, wherein in response to a user request to build a course, the collaboration engine is further configured to:

generate a list of topics;

build a course based on user selections from the list of topics; and wherein the reconciliation engine validates the course as unique.

18. The system of claim 14, wherein a graphical user interface (GUI) is configured for collaborative teaching and learning.

19. The system of claim 14, wherein users are members of private and open teams; and wherein topic records in open teams are available to share with one or more other teams or organizations.

* * * * *